(12) United States Patent
Pillias et al.

(10) Patent No.: US 12,517,154 B2
(45) Date of Patent: Jan. 6, 2026

(54) CLAMP FOR MEASURING AC AND DC LEAKAGE CURRENTS

(71) Applicant: CHAUVIN ARNOUX, Asnieres-sur-Seine (FR)

(72) Inventors: Benoit Pillias, Asnieres-sur-Seine (FR); Stephane Dudognon, Asnieres-sur-Seine (FR); Francisque Pion, Asnieres-sur-Seine (FR)

(73) Assignee: CHAUVIN ARNOUX, Asnieres-sur-Seine (FR)

( * ) Notice: Subject to any disclaimer, the term of this patent is extended or adjusted under 35 U.S.C. 154(b) by 217 days.

(21) Appl. No.: 18/338,508

(22) Filed: Jun. 21, 2023

(65) Prior Publication Data

US 2023/0417803 A1 Dec. 28, 2023

(30) Foreign Application Priority Data

Jun. 23, 2022 (FR) ...................................... 2206239

(51) Int. Cl.
*G01R 15/20* (2006.01)
*G01R 31/52* (2020.01)

(52) U.S. Cl.
CPC ........... *G01R 15/205* (2013.01); *G01R 31/52* (2020.01)

(58) Field of Classification Search
CPC .. G01R 15/205; G01R 15/185; G01R 15/186; G01R 31/52; G01R 1/18; G01R 1/22
See application file for complete search history.

(56) References Cited

U.S. PATENT DOCUMENTS

| | | | | |
|---|---|---|---|---|
| 7,884,598 | B2 * | 2/2011 | Wang ....................... | G01R 1/22 |
| | | | | 324/127 |
| 10,775,409 | B2 * | 9/2020 | Worones ................ | G01R 15/12 |
| 11,536,747 | B2 * | 12/2022 | Weinstein ............... | H01F 19/04 |
| 2001/0050552 | A1 | 12/2001 | Sandquist et al. | |
| 2002/0096640 | A1 * | 7/2002 | Tanaka ................... | G21K 1/093 |
| | | | | 250/397 |
| 2009/0058399 | A1 * | 3/2009 | Wang ....................... | G01R 1/22 |
| | | | | 324/127 |
| 2014/0009146 | A1 * | 1/2014 | Blagojevic ............. | G01R 33/07 |
| | | | | 324/252 |
| 2017/0336443 | A1 * | 11/2017 | Yokota .................. | G01R 15/148 |
| 2022/0082590 | A1 * | 3/2022 | Steuer .................. | G01R 15/207 |

FOREIGN PATENT DOCUMENTS

| | | | | |
|---|---|---|---|---|
| CN | 212433241 | * | 3/2020 | ............ G01R 15/20 |
| CN | 211505675 | U | 9/2020 | |
| CN | 212433241 | U | 1/2021 | |
| EP | 3405795 | * | 1/2017 | .......... G01R 15/186 |
| WO | 2010106304 | A1 | 9/2010 | |

OTHER PUBLICATIONS

French Search Report from corresponding FR Application No. 2206239, Feb. 7, 2023.

* cited by examiner

*Primary Examiner* — Dominic E Hawkins
(74) *Attorney, Agent, or Firm* — Workman Nydegger

(57) ABSTRACT

The invention relates to a measurement clamp comprising a fixed jaw and a moving jaw, the fixed jaw comprising a first magnetic core entirely surrounded by a first magnetic shield and the moving jaw comprising a second magnetic core entirely surrounded by a second magnetic shield, the first and second magnetic cores being separated by two diametrically opposite air gaps each receiving a magnetic flux sensor, and an external flux-cancellation coil surrounds one or the other, or both, of the first and second magnetic shield.

9 Claims, 4 Drawing Sheets

CLAMP FOR MEASURING AC AND DC LEAKAGE CURRENTS

TECHNICAL FIELD

The present invention relates to the field of measurement of alternating and/or direct currents and concerns, more particularly, a clamp for measuring leakage currents capable of measuring low value AC and DC currents (<1 mA) reliably (error less than 10% at 1 mA).

BACKGROUND

The leakage current is the vector sum of the currents flowing in the clamped wires simultaneously in the measurement clamp. This sum is very low compared with the direct currents which flow in each of these wires. Also, in order to ensure a reliable measurement, it is necessary that the influences linked to the external magnetic fields (Earth's field, current outside the clamp, etc.) and to the differential mode (phase and neutral passing at the same time in the clamp) are weak compared to the current to be measured.

In the majority of clamps for measuring AC and DC currents, a magnetic sensor is used to measure the DC part of the signal, the AC part being measured by a coil symmetrically surrounding the magnetic circuit and which also produces DC cancellation of the flux in order to avoid saturation of the magnetic circuit when a large current flows in the magnetic circuit. The "crossover" frequency between the two measurement systems (magnetic sensor and flux-cancellation coil), i.e. the frequency beyond which the signal from the flux-cancellation coil dominates by its amplitude the signal of the magnetic field sensor, is typically of order several Hertz to several tens of Hertz.

Certain models of measurement clamp give excellent results in rejecting external magnetic fields (typically greater than 100 dB). However, these models only operate for alternating current and the addition of a DC current measuring functionality requires, in the magnetic circuit, the particularly complex use of one or more magnetic sensors, the balancing of which with regard to these external magnetic fields must be made in the factory, for example with a Helmholtz coil. With regard to the models which only operate for a direct current, for which the sensors used are often Hall effect sensors, these prove too noisy and cannot measure very low leakage currents (of order 100 μA), in other words with at least 100 dB of attenuation between a current adjacent to the clamp and a current passing in the clamp, which corresponds to measuring a current of 100 μA in the presence of a conductor adjacent to the clamp passing 10 A, and with at least 100 dB of attenuation in differential mode, which corresponds to not measuring more than 100 μA of leakage current when a conductor crossed by a current of 10 A passes in both directions of the clamp.

In order to obtain more precision, it is also known to use sensor technologies that are less noisy than Hall effect sensors, such as fluxgate sensors. However, these sensors, which are at least 5 mm long, cannot be incorporated in the air gaps of the magnetic circuit and must be arranged in the body of the measurement clamp itself, which once again does not allow the aforementioned rejection levels to be attained.

SUMMARY

The main object of the present invention is therefore a clamp for measuring AC and DC leakage current, which enables a very high rejection of external magnetic fields. Another object of the invention is to allow an operator to carry out, alone, the balancing of the magnetic sensors of the measurement clamp without having to send them back to the factory.

These objects are achieved by a measurement clamp comprising a fixed jaw and a moving jaw, characterised in that the fixed jaw comprises a first magnetic core entirely surrounded by a first magnetic shield and the moving jaw comprises a second magnetic core entirely surrounded by a second magnetic shield, the first and second magnetic cores being separated by two diametrically opposite air gaps each receiving a magnetic flux sensor, and a flux-cancellation coil surrounding one or the other, or both, of the first and second magnetic shields.

Thus, by taking the flux-cancellation coil out of the magnetic shield, it can then be separated into two half-coils generating two opposing magnetic fields in order to allow balancing of the magnetic flux sensors in the event of stray external magnetic field.

Each of the fixed and moving jaws is preferably formed of a measurement half-torus ensuring the concentration of the internal magnetic field surrounded by a half-shield made of magnetic material protecting from external magnetic fields, preferably made of Mu-metal.

The measurement half-torus of the fixed jaw advantageously comprises a window at each end, for the current supplies from an electronic card connected via a connection cable to a user interface of the measurement clamp.

The external flux-cancellation coil preferably consists of two windings, placed around one of the two magnetic half-shields, preferably the half-shield of the moving jaw, and able to generate, at the two magnetic flux sensors, two opposing magnetic fields in a rotating reference frame, or else two windings placed around two magnetic half-shields and able to generate, at the two magnetic flux sensors, two opposing magnetic fields in a rotating reference frame.

According to an advantageous embodiment, in which the magnetic flux sensor is an AMR sensor, the measurement clamp further comprises a test coil arranged under each of the AMR sensors in order to generate a magnetic field of known value at the AMR sensor and an associated test circuit for determining the saturation state of the AMR sensors.

The AMR sensor preferably consists of four thin-film ferromagnetic resistors connected to a Wheatstone bridge, a flip coil and an associated control circuit enabling the polarity of the output voltage of the bridge to be inverted by applying current set and reset pulses to the flip coil.

Advantageously, the set/reset pulses are controlled at a frequency of several kHz with a duration of several hundred nanoseconds to several microseconds.

The air gaps preferably have a width less than 1 mm and greater than the width of the magnetic flux sensor.

BRIEF DESCRIPTION OF THE FIGURES

Other features and advantages of the present invention will become apparent from the description given below, with reference to the appended drawings which illustrate an exemplary embodiment that is in no way limiting and wherein.

DETAILED DESCRIPTION OF THE INVENTION

The principle of the invention rests on the use of an AMR (anisotropic magneto-resistive) magnetic flux sensor as magnetic field sensor to which are added flux-cancellation windings and a test coil of saturation of the sensor.

Figure 1:
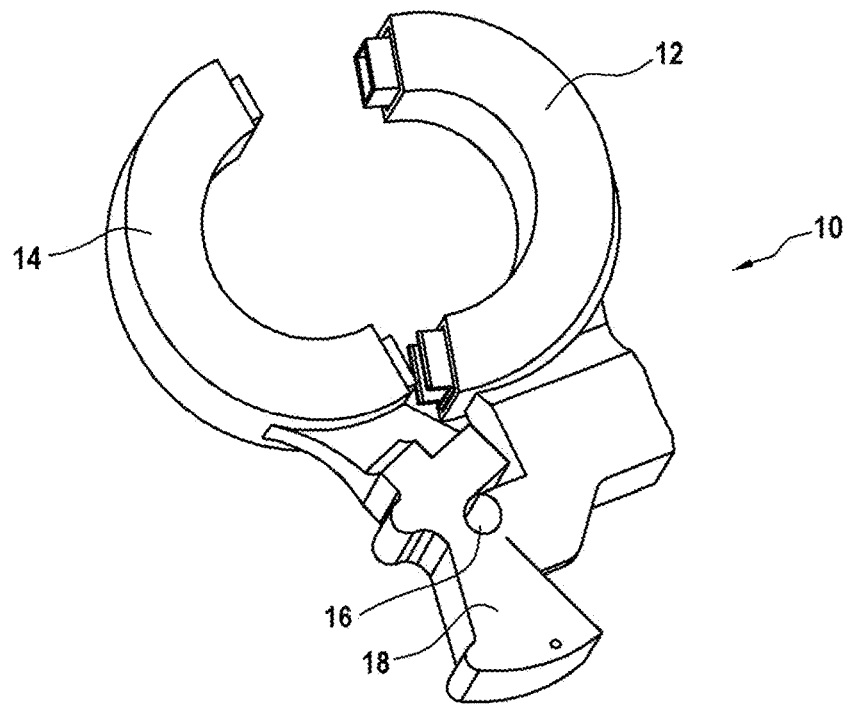
FIG. 1 shows the internal structure of a measurement clamp with open jaws, according to the invention.

The internal structure of the measurement clamp, with jaws open, of FIG. 1 is intended to measure AC and DC currents, more particularly leakage currents. It is illustrated without its external casing and with its user interface comprising control buttons and display screen arranged conventionally on its holding handle. The clamp 10 conventionally consists of a fixed jaw 12 and a moving jaw 14 which can dissociate from the fixed jaw by pivoting about an articulation axis 16 rigidly connected to the body of the handle 18 and thus enable the insertion of the conductor (referred to as the internal conductor in the remainder of the description) or conductors clamped in the jaws of this clamp and for which it is desired to measure the current.

Figure 2:
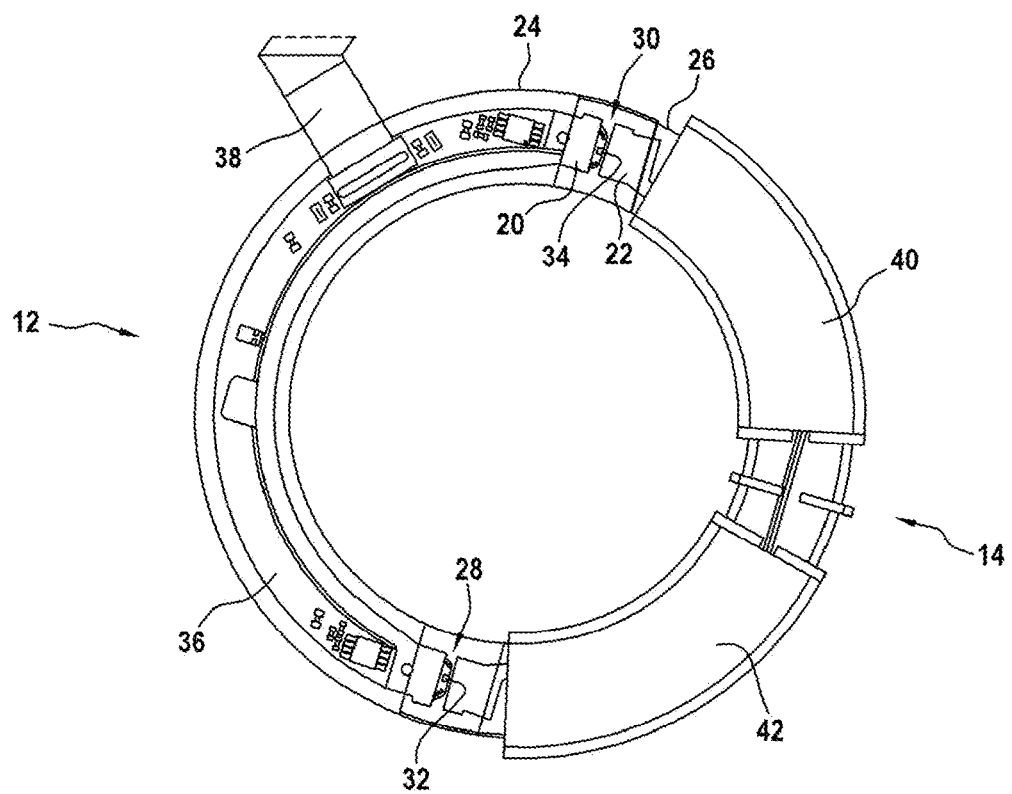
FIG. 2 illustrates the various assemblies forming the two jaws of the measurement clamp of FIG. 1.

In FIG. 2, it can be seen that the two jaws, fixed 12 and movable 14, each consist of a sub-assembly consisting of a measurement half-torus 20, 22 which ensures the concentration of the magnetic field, entirely surrounded by a half-shield made of magnetic material 24, 26, preferably made of Mu-metal, which interlock with one another at their two ends in order to ensure protection from external magnetic fields (this interlocking is not however forced, but sliding, generating a very small free space between the two half-shields, in order to allow the rotation of the moving jaw). At the two diametrically opposed junctions 28, 30 between the two half-toruses 20, 22, referred to as "air gaps", two magnetic sensors 32, 34 are arranged, soldered on the same electronic card 36 integral with the single fixed half-torus 20 and receiving a connection cable 38 in order to ensure the connection with the user interface of the measurement clamp.

It is important to note that the magnetic shield is present over the entire circumference of the measurement torus, and not only at the air gaps alone, as may exist in the prior art. Such an enveloping shield is approximately ten times more effective than a simple end shield, to which it cannot be compared. It will be recalled that to be effective, a magnetic shield must be separated from the measurement torus by a significant blade of air and have the smallest possible air gap in order to facilitate passage of the stray magnetic field in the shield as much as possible.

In order to avoid saturation of the magnetic circuit, two external flux-cancellation windings 40, 42, which are independent of one another, are placed around one of the two half-shields, preferably the half-shield 26 of the moving jaw 14 (however, it remains possible to place a winding on each fixed or movable half-torus). This non-symmetric configuration outside the half-shields does not contribute to the measurement but only to cancellation of the flux and also makes it possible to cancel the magnetic flux in these half-shields, which therefore always remain efficient even when a large current flows in the half-toruses 20, 22. The conventional flux-cancellation coil no longer needs to be symmetric in order to compensate the external stray fields and can therefore be placed on a single half-torus as proposed. In addition, the production of the flux-cancellation coil in the form of two windings (two half-coils) makes it possible to generate two opposing magnetic fields, in a rotating reference frame, at the two magnetic flux sensors, in order to set the magnetic sensors in the presence of a stray external magnetic field, without resorting to the prior art, as will be explained further.

Figure 3:
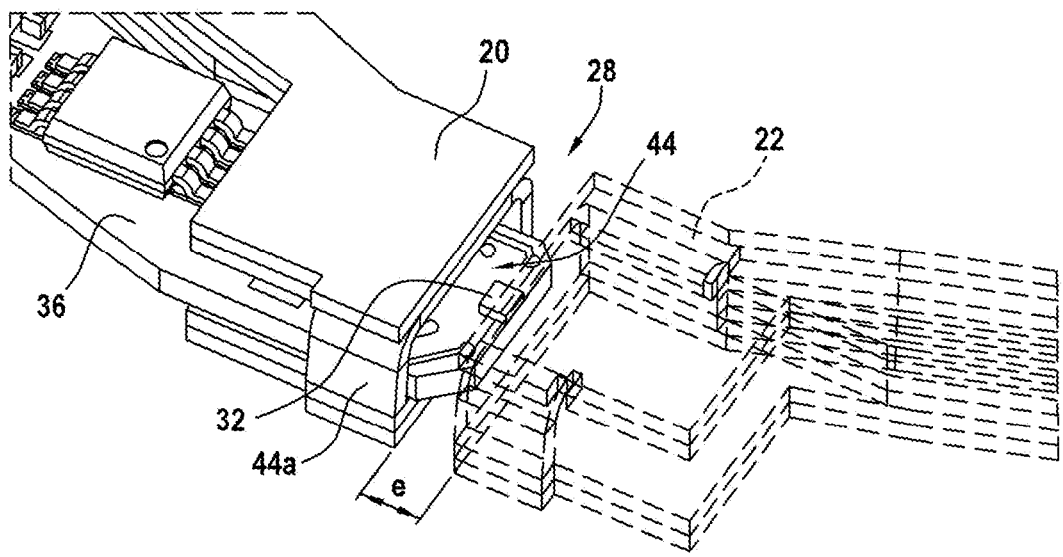
FIG. 3 shows the detail of an end of the jaw carrying the magnetic sensor.

FIG. 3 shows, in more detail, the junction at the air gaps 28, 30 in which the magnetic sensor 32, 34 is inserted in order to measure the DC currents. Using AMR technology, the sensor must be placed parallel to the field lines and be perfectly centred in the middle of the air gap, the width e of which is greater than that of the sensor which is typically of order less than 1 mm (for example 0.7 mm). The low value of the air gap also allows penetration of the stray external field to be limited as much as possible. However, these stray fields having managed to pass through the spaces extending between the ends of the half-shields 24, 26, would nevertheless remain two large and could significantly distort the measurement if a single magnetic sensor was used for this measurement. This is why the invention uses two magnetic sensors, one at each air gap, and overcomes these stray external fields by adding the measurements of these two sensors. Indeed, the rotating field generated in the two measurement half-toruses by an internal conductor is added, whereas the field generated by an external conductor flowing in the same direction in the two sensors is subtracted.

When the magnetic sensors have a width greater than the air gaps, the two ends of the measurement half-torus 20 of the fixed jaw 12 comprise a window 44 in order to free up the space for installing of the magnetic sensor. For magnetic sensors with width less than the air gap, this window facilitates the current supplies via the electronic card 36. Functionally, only the high and low parts of this window are used to generate the magnetic field for the magnetic sensor, but the two sides 44a of this window have a shielding effect to guard against the field radiating through the spaces extending between the two half-shields.

The part of the AMR sensor that is sensitive to the magnetic field consists of four thin-film ferromagnetic resistances connected to a Wheatstone bridge. In addition to the bridge circuit, the AMR sensor comprises other components such as an external flip coil and an associated circuit which can periodically reverse the polarity of the output voltage of the bridge by applying current set and reset pulses to the flip coil. Indeed, these AMR sensors have an offset which varies according to temperature and time, in a non-negligible manner. The effect of the set/reset circuit (also called a flip circuit) positioned as close as possible to the component, is to periodically reverse the polarity of the sensor and to facilitate the cancellation of this offset during processing of the measurement signal, as will be indicated below.

Figure 4:
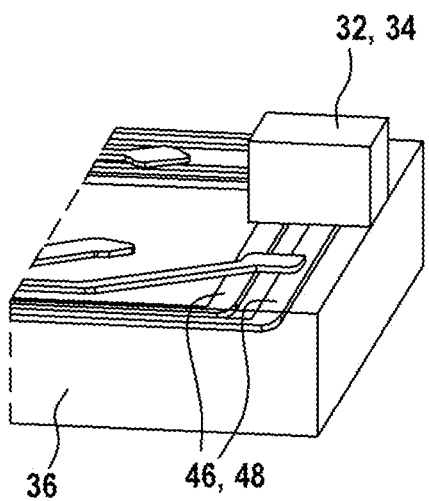
FIG. 4 shows the positioning of the test coils making it possible to know the saturation state of the magnetic sensors.

These AMR sensors also have very low saturation fields (<1 mT) and can therefore be rapidly saturated (for example in the event of a change of measurement range or when the measurement is started in the presence of a current). It is therefore necessary to know the state of saturation of the magnetic sensor in order to avoid any error in the measurement. However, when an AMR sensor saturates, in the presence of variation of the magnetic field, the variation in output voltage is reversed or zero. Also, according to the invention and as shown in FIG. 4, wires 46, 48 (or a coil of several turns (typically two turns)) supplied from a current generator (illustrated further in FIG. 6) are arranged under the sensor in order to generate a magnetic field of known value at the sensor and to determine the saturation of the sensor if its output voltage does not change or changes in the wrong direction.

Figure 5:
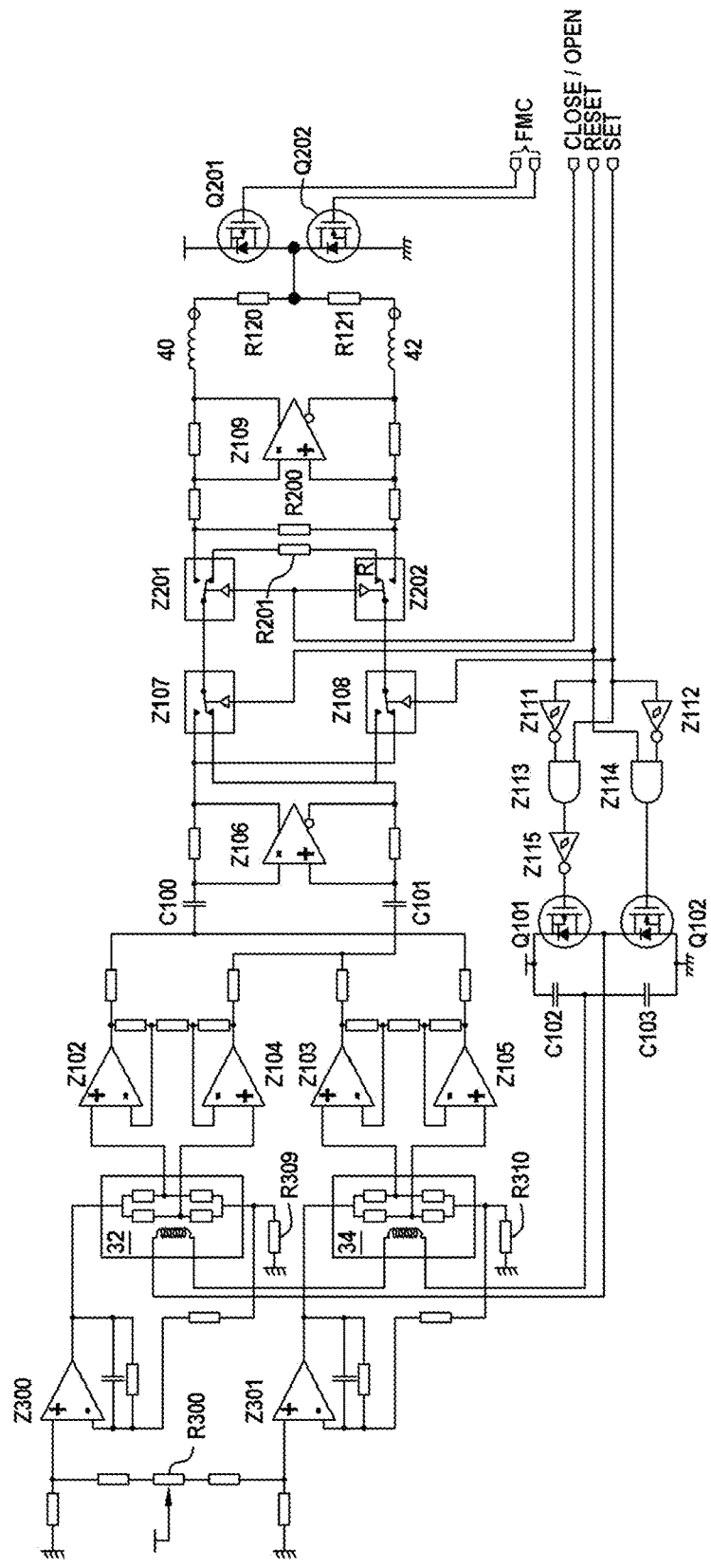
FIG. 5 illustrates the measurement circuit associated with the magnetic sensors of the measurement clamp.

The principle of the measurement acquisition system is illustrated in FIG. 5. It should be noted that this acquisition system can be produced entirely with "fully differential" amplifiers as well as with simple standard (single-ended) differential amplifiers.

It is organised around several functions. The first function, produced by the logic components Z111 to Z115 and switches Q101, Q102 and capacitors C102 and C103, can control the flip coils of the magnetic sensors so that the output of these sensors is modulated at the flip frequency. The set/reset commands are controlled at a frequency of several kHz with a duration of several hundred nanoseconds to several microseconds.

The second function, performed by the amplifiers Z102 to Z105, can amplify the signal from the magnetic sensors AMR 32, 34. These amplifiers must be positioned as close as possible to the sensors in order to limit the contamination of the signal by the surrounding electromagnetic noise. The two signals from the first amplifiers are then sent to a differential amplifier Z106 having a double function: on the one hand, it can subtract these signals and thus eliminate the part of the signal coming from external magnetic fields and, on the other, with the capacitors C100 and C101, can delete the DC component of the modulated signal from the magnetic sensors, which is the offset that it is desired to cancel.

The signal can then be demodulated by the changeover switches Z107 and Z108, the output of which gives the image of the differential or "rotating" magnetic field, in the magnetic circuit. The changeover switches Z201 and Z202 being closed, this signal amplified by a differential amplifier Z109 is then transmitted to the external flux-cancellation windings 40, 42 in order to cancel (or rather to reduce, because a minimum flux is required for its operation) the induction in the sensors. The number of turns of the coil being several hundreds of turns, the current supplied by the amplifier is only several milliamperes. The image of the measurement current is the sum of the voltages at the terminals of the resistors R120 and R121, the measurement output consisting of the flux-cancellation current.

The magnetic sensors 32, 34 are supplied with current by amplifiers Z300 and Z301 which deliver a current controlled by measuring the current passing through the sensors via, respectively, shunt resistors R309 and R310 connected to these magnetic sensors, and the balancing takes place by adjusting a potentiometer R300 connecting the inputs of these two amplifiers. This potentiometer can advantageously be replaced by a digital potentiometer in order to produce an entirely automatic calibration, in such a way that the measurement clamp indicates a current of 0 mA.

Since the air gaps 28, 30 cannot mechanically be perfectly identical, the stray fields will not be distributed equally in each air gap and as previously mentioned, the compensation cannot be perfect by using only the above-mentioned functions and it is therefore necessary to combine a function of adjusting the gains of the magnetic sensors in order to perfectly balance the measurement of the two sensors, this adjusting of the gain also having to be able to be made throughout the life of the measurement clamp because it deteriorates at its shielding following impacts, for example, or at the materials (matting) forming the air gaps.

The invention proposes overcoming the conventional external of adjustment by a Helmholtz coil and generating a stray magnetic field in the external windings 40, 42 forming the flux-cancellation coil, a first external winding generating a magnetic field rotating in the clockwise direction and the second in the trigonometric direction, so as to create, at the two magnetic flux sensors, two magnetic fields oriented in the same direction in a Cartesian reference frame (or in opposition in a rotating reference frame).

To do this, the flux-cancellation loop is open by switching the changeover switches Z201 and Z202 into an open adjustment position R. The resistor R200 can impose a zero value on the differential currents flowing in opposition in the external windings. The common mode voltages at the output of the amplifier Z109 are thus set to $V_{DC}/2$.

Then, by controlling, in a manner alternative to the common mode frequency (FMC), the switches Q201 and Q202, a common mode current can be imposed in the two external windings 40, 42 generating two magnetic fields oriented in the same direction (in a Cartesian, therefore non-rotating, reference frame) at the magnetic sensors.

If the air gaps are not equal, or if the gains of the sensors are different, a voltage will appear at the common mode frequency at the terminals of the resistor R201 and it is then necessary to modify the setting of the potentiometer R300 in order to obtain a zero voltage at the terminals of the resistor R201 and thus obtain a perfect balance.

Figure 6:
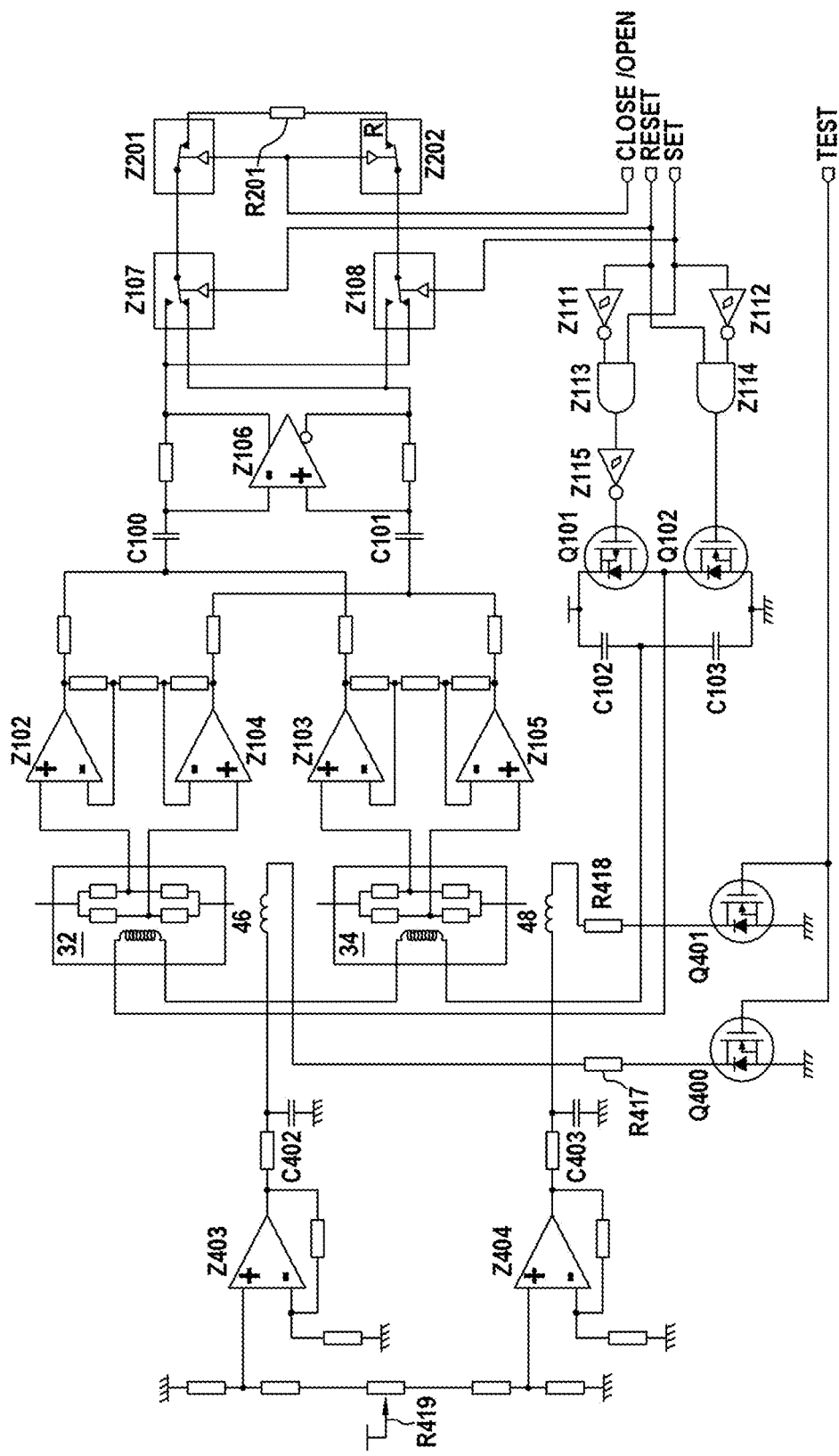
FIG. 6 illustrates the measurement circuit associated with the test coils.

To this main measurement and acquisition system, can be added an additional test function for checking the saturation of the magnetic sensors, as illustrated in FIG. 6 which takes the elements already described with respect to the preceding FIG. 5 (the outputs of amplifiers Z102 to Z105 being however connected in order to add the signals thereto and not subtract them as in FIG. 5) and adds thereto additional components, enabling this test function to be performed.

To do this, two reference voltages are fixed with the amplifiers Z403 and Z404, capacitors C402 and C403 placed at the output of these amplifiers enabling energy to be stored. When it is desired to perform a test in order to check that the magnetic sensors are not saturated, the TEST signal is switched to 1. The switches Q400 and Q401 conduct and allow current to flow, equal to the reference voltage divided by the value of the resistances R417 (or R418) in the wires or test coils 46, 48. The reference voltages have been set beforehand using the potentiometer R419 so as to obtain an identical output voltage of the sensors. In this way, the subtraction of the two signals gives a value of zero and this test function does not affect the main measurement system which reacts as explained above.

Thus, if the voltage detected at the terminals of the resistor R201 is positive, then the magnetic sensors are not saturated. if it is of low or negative amplitude, then the magnetic sensors are saturated.

The invention claimed is:

1. A measurement clamp comprising:
a fixed jaw and a moving jaw,
wherein the fixed jaw comprises a first magnetic core entirely surrounded by a first magnetic shield and the moving jaw comprises a second magnetic core entirely surrounded by a second magnetic shield,
the first and second magnetic cores being separated by two diametrically opposite air gaps each receiving a magnetic flux sensor, and
an external flux-cancellation coil surrounds one or the other, or both, of the first and second magnetic shields,
wherein the magnetic flux sensor is an AMR sensor consisting of four thin-film ferromagnetic resistors connected to a Wheatstone bridge, a flip coil and an associated control circuit enabling the polarity of an output voltage of the bridge to be reversed by applying current set and reset pulses to the flip coil.

2. The measurement clamp according to claim 1, wherein each of the fixed and moving jaws is formed of a measurement half-torus ensuring concentration of an internal magnetic field surrounded by a half-shield made of magnetic material protecting from external magnetic fields, preferably made of Mu-metal.

3. The measurement clamp according to claim 2, wherein the measurement half-torus of the fixed jaw comprises a window at each end, for current supplies from an electronic card connected via a connection cable to a user interface of the measurement clamp.

4. The measurement clamp according to claim 2, wherein the external flux-cancellation coil consists of two windings placed around one of the two magnetic half-shields and able to generate, at the two magnetic flux sensors, two opposing magnetic fields in a rotating reference frame.

5. The measurement clamp according to claim 2, wherein the external flux-cancellation coil consists of two windings placed around the two magnetic half-shields and able to generate, at the two magnetic flux sensors, two opposing magnetic fields in a rotating reference frame.

6. The measurement clamp according to claim 1, wherein the air gaps have a width less than 1 mm and greater than the width of the magnetic flux sensor.

7. The measurement clamp according to claim 1, wherein the magnetic flux sensor is an AMR sensor, the measurement clamp further comprising a test coil arranged under each of the AMR sensors in order to generate a magnetic field of known value at the AMR sensor and an associated test circuit for determining a saturation state of the AMR sensors.

8. The measurement clamp according to claim 1, wherein set/reset pulses are controlled at a frequency of several kHz with a duration of several hundred nanoseconds to several microseconds.

9. The use of a measurement clamp according to claim 1 for measuring AC and DC leakage currents.

* * * * *